Dec. 17, 1929.  A. RAPISARDI  1,740,035
HOLDER FOR ELECTRIC CONDUCTORS
Filed Feb. 6, 1924
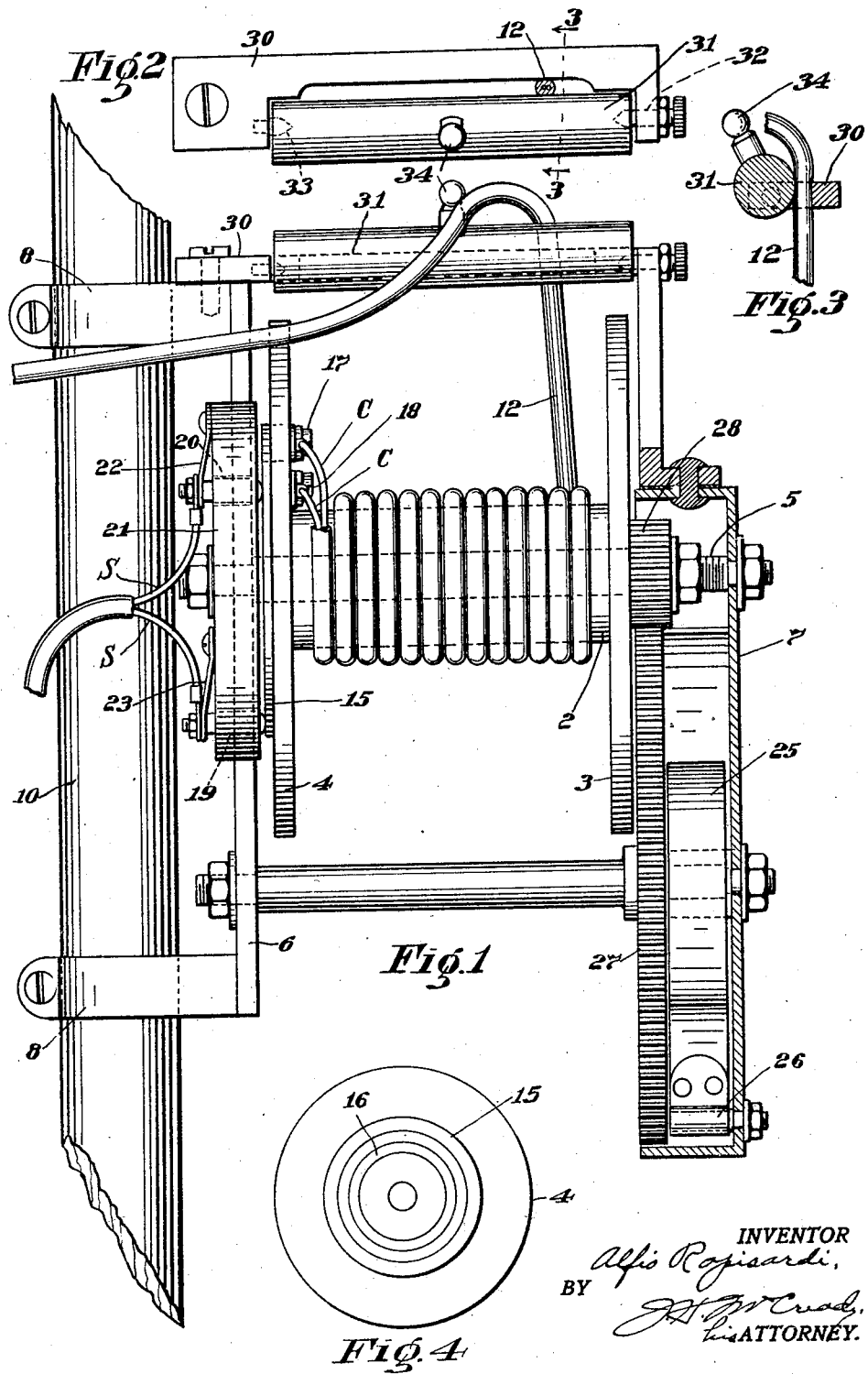

Patented Dec. 17, 1929

1,740,035

UNITED STATES PATENT OFFICE

ALFIO RAPISARDI, OF BOSTON, MASSACHUSETTS

HOLDER FOR ELECTRIC CONDUCTORS

Application filed February 6, 1924. Serial No. 690,977.

This invention relates to apparatus for supporting the electric cable or conductor used to supply current to a portable electric implement of some character, such, for instance, as a domestic vacuum cleaner.

Electric current usually is supplied to the motor of a vacuum cleaner by means of a conductor, commonly called a "cord," which connects the motor with a supply outlet or socket. In using the cleaner this conducting cord is a source of constant annoyance, due to the fact that the slack cord is lying on the floor and is in the way much of the time. The present invention aims to devise a holder for the cord or cable which will obviate this objection. It is also an object of the invention to provide an article of this character which will be simple in construction, reliable in operation, and which can be manufactured economically.

The nature of the invention will be readily understood from the following description when read in connection with the accompanying drawings, and the novel features will be particularly pointed out in the appended claim.

In the accompanying drawings,

Figure 1 is a view, partly in side elevation and partly in cross section, showing an apparatus embodying the invention in the form at present preferred;

Fig. 2 is a plan view of the parts for clamping the cord;

Fig. 3 is a cross sectional view on the line 3—3, Fig. 2; and

Fig. 4 is an end view of one of the end plates of the reel showing the slip rings mounted thereon.

The construction shown comprises a reel which consists of a barrel 2 and end disks or "heads" 3 and 4 secured to said barrel. These parts may conveniently be made of wood or fibre. The reel is mounted to rotate on a stationary shaft 5, one end of which is supported in a plate 6 and the other in a casing or shell 7, both the plate and the casing constituting parts of the supporting bracket for the device. This bracket also includes split clamps 8—8 by means of which the device may be secured to the handle 10 of a vacuum cleaner or other electrical implement with which the device is to be used.

An electric cable 12 is wound on the reel 2, and in the form shown includes two parallel conductors C—C which usually are twisted together and enclosed in an insulating covering. These two conductors are connected, respectively, to two metal slip rings 15 and 16, Fig. 4, which are secured to the outer face of the disk 4 of the reel. This connection may be conveniently made by binding posts, as indicated at 17 and 18, respectively, Fig. 1, these posts being secured, respectively, to the rings 15 and 16 and extending through the head 4 of the reel. Cooperating with these two rings 15 and 16 are two stationary contacts 19 and 20, respectively, consisting of plungers supported by a stationary plate 21 which is made of insulating material and is secured on the stationary shaft 5. Service conductors S—S lead from the contacts 19 and 20 to the motor of the cleaner. These contacts are held in engagement with their respective rings by means of springs 22 and 23, respectively. Due to this arrangement the supply of current to the motor is not interrupted or affected in any way by the rotation of the reel.

For the purpose of winding up the cord on the reel, a torsion spring 25 is located in the casing 7 and one end of this spring is anchored on a pin 26, while the other end is fastened to the hub of a gear 27 which meshes with a pinion 28 fastened on the end of the reel. The cord is unwound from the reel simply by pulling on it, and the rotary motion of the reel produced in this manner is transmitted through the gearing to the torsion spring 25, thus winding up this spring. The power so stored in the spring is returned to the reel again as soon as the strain on the cord is released, or, in other words, as soon as there is any slack in the cord.

In order to enable the operator to prevent the winding up of the cord by the reel, whenever desired, the cord is led from the reel through a clamping device comprising a U-shaped bracket 30, Figs. 2 and 3, and a cylindrical member 31 supported on pivot points 32 and 33 which are carried by the bracket 30. This bracket is mounted just above the reel. As clearly shown in Fig. 3, the cylinder 31 is eccentrically mounted, and it is provided with a handle 34 by means of which it may be swung into or out of clamping position. When the handle 34 is tipped downwardly, the cord 12 may slip freely through the clamping device, and this is the normal position for the handle. When it is desired to clamp the cord at any desired point, the handle 34 is swung upwardly, and the cylinder 30 then pinches the cord against an intermediate portion of the bracket 30 and prevents the reel from winding up the cord. The cord may be released again simply by turning the handle 34 down.

It will now be appreciated that this invention provides a very simple holder for supporting the electric conducting cable or cord used with electrically operated vacuum cleaners or electric implements of various kinds. The cord may be withdrawn or unwound as more is desired simply by pulling on it, and the reel operates automatically to take up the slack in the cord as soon as the strain on it is reduced. At the same time the cord can be conveniently clamped whenever desired in order to relieve the operator of the pull exerted on the cord by the reel. The length of cord in use, therefore, at any time is substantially that required for the use of the implement at that instant, and such length is increased or decreased almost instantly as a different length becomes desirable. There is never any accumulation of slack cord on the floor to interfere with the use of the cleaner, or to become snarled and catch in articles of furniture as the cleaner is moved from one part of a room to another. Furthermore, the device is very simple in construction, can be manufactured economically, and it is not liable to get out of order.

Having thus described my invention, what I desire to claim as new is:

A cord holder for portable electric apparatus comprising, in combination, a supporting bracket, a reel, an electric conductor cord wound on said reel, a stationary shaft supported by said bracket and supporting said reel, said cord including two parallel conductors, two slip rings mounted on one end of said reel in co-axial relationship to the reel, a member secured to said shaft, two stationary contacts supported by said member and engaging, respectively, with said rings, two service conductors leading, respectively, from said contacts, a pinion rotating with said reel, a second shaft supported in said bracket, a gear mounted on said second shaft, a coiled spring encircling said second shaft, a casing for said gears and spring, one end of said spring being secured to said casing and the other end to said gear, means for securing said bracket to said apparatus, and a device adjustable manually and independently of the cord for locking said cord when desired against the winding action of said reel.

ALFIO RAPISARDI.